United States Patent [19]
Jeker et al.

[11] Patent Number: 5,238,215
[45] Date of Patent: Aug. 24, 1993

[54] VIBRATION-DAMPING MOUNT

[75] Inventors: René Jeker, Hombrechtikon; Rudolf Reiser, Küsnacht, both of Switzerland

[73] Assignee: Spectrospin AG, Switzerland

[21] Appl. No.: 856,473

[22] Filed: Mar. 23, 1992

[30] Foreign Application Priority Data

Mar. 28, 1991 [DE] Fed. Rep. of Germany ....... 4110250

[51] Int. Cl.$^5$ .............................................. F16M 3/00
[52] U.S. Cl. .................................. 248/638; 248/581; 248/631; 248/678
[58] Field of Search ............... 248/638, 631, 581, 562, 248/676, 678, 188.2, 188.4, 603, 636; 267/141.2, 292, 153

[56] References Cited

U.S. PATENT DOCUMENTS

| | | | |
|---|---|---|---|
| 4,643,385 | 2/1987 | Sandercock | 248/638 |
| 4,676,473 | 6/1987 | Giles | 248/638 |
| 4,709,908 | 12/1987 | Joseph et al. | 248/638 X |
| 4,806,437 | 2/1989 | Yokoi et al. | 267/292 X |
| 5,040,764 | 8/1991 | Dubois | 248/638 X |
| 5,069,413 | 12/1991 | Carson et al. | 248/638 |
| 5,117,402 | 5/1992 | Myers et al. | 248/676 X |

FOREIGN PATENT DOCUMENTS

| | | |
|---|---|---|
| 103188 | 3/1984 | European Pat. Off. . |
| 1065670 | 11/1956 | Fed. Rep. of Germany . |
| 1243922 | 10/1963 | Fed. Rep. of Germany . |
| 1249600 | 11/1963 | Fed. Rep. of Germany . |
| 3143881 | 11/1981 | Fed. Rep. of Germany . |
| 3834135 | 10/1988 | Fed. Rep. of Germany . |
| 3917408 | 5/1989 | Fed. Rep. of Germany . |

OTHER PUBLICATIONS

DE-Brochure: Breadboards–optische Tische–Schwingungsdämpfer–Sensoren, Fa. Microplan Schwingungstechnik, 6690 St. Wendel, 1987, pp. 1–22.

*Primary Examiner*—Ramon O. Ramirez
*Attorney, Agent, or Firm*—Walter A. Hackler

[57] ABSTRACT

The invention concerns a vibration-damping mount (1) for vibration-sensitive equipment and apparatus. The vibration-damping mount (1) has a damping device (10), a supporting structure (20) connected thereto, shock absorption elements (30), and height adapters (40). The vibration-damping mount (1) can be divided, and can be erected without changing the position of the unit being held.

14 Claims, 5 Drawing Sheets

VIBRATION-DAMPING MOUNT

BACKGROUND OF THE INVENTION

The invention concerns a vibration-damping mount for holding vibration-sensitive equipment, especially in conjunction with cryostats, with a damping device, a supporting structure, shock absorption elements, and height adapters.

An optical table for vibration damping is known from the company brochure entitled "Breadboards—Optical benches—Vibration dampers—Sensors," of MICROPLAN Sensortechnik, D-6690 St. Wendel, Germany, published in 1987. The table plate consists of two horizontal steel plates that are joined to one another by vertical steel honeycombs. To damp the propagation of vibrations within the table plate, the cavities are filled with a polymer foam. In the so-called "Mylon table," in place of the foam a quartz sand mixture is poured into the steel honeycomb and compressed. The table plate rests on four feet equipped with shock absorption elements and, if applicable, with height adapters.

If an existing table is to be replaced by the known optical table, an optical measurement arrangement, for example, that is constructed on the existing table must be completely disassembled and the measurement and supply lines must be disconnected. Once the known optical table has been erected, the optical measurement arrangement must be once again set up and adjusted, and the lines must once again be interconnected. This entails considerable effort.

With known stands for holding a superconducting magnet (located in a cryostat) of an NMR spectrometer, it is also not possible to replace an existing stand, which is holding a cryostat that is in use, with a different stand without removing the cryostat with the superconducting magnet, or at least changing its position. If the position of a superconducting magnet (located in a cryostat) of an NMR spectrometer is changed, a complex and laborious readjustment process is necessary, requiring several days.

SUMMARY OF THE INVENTION

The object of the invention is to provide a vibration-damping mount that can be erected without changing the position of a unit being held by means of a conventional stand, so that the conventional stand can be replaced without a great deal of effort.

According to the invention, this object is achieved by the fact that the vibration-damping mount can be divided into a plurality of segments of essentially the same structure, with each segment comprising a section of the damping device, the supporting structure, at least one shock absorption element, and a height adapter.

As a result, the vibration-damping mount can be erected around an existing stand. When the vibration-damping mount according to the invention is erected in order to replace an existing stand, a unit that is being held can be left in place, and connections—for example, cables, cooling water lines, or liquid gas lines—to an operating unit can remain. No auxiliaries such as cranes or hoists are needed to hold the unit while the vibration-damping device is being erected. Pneumatic or piezoelectric damping elements are especially suitable as shock absorption elements. The identical structure of the segments results in uniform load distribution. The process of replacing an existing stand that is holding a superconducting magnet (located in a cryostat) of an NMR spectrometer is shortened by the use of the vibration-damping mount according to the invention from several days to a few hours. The complex, laborious readjustment of the superconducting magnets becomes unnecessary.

The invention can be developed in such a way that the vibration-damping mount has three segments. This has the advantage that the bracing of the vibration-damping mount is statically defined.

In one embodiment of the invention, the damping device has two plate-like parts that are joined to one another by damping material that transfers the weight of the unit being held. When constructed in this manner, the damping device is easy to manufacture but still effective and durable. This damping device contains no parts which contact one another and move with respect to one another, and is therefore not subject to any wear. This damping device prevents or reduces the transfer of vibrations from the stationary part of the vibration-damping mount to the unit being held, thus absorbing building vibrations, for example. It acts in addition to the shock absorption elements.

In a preferred embodiment of the invention, the plate-like parts of the damping device are arranged essentially vertically. As a result, the weight of the unit being held is transferred through the damping material by shear forces that cause shear stresses in the damping material. Vibration damping is influenced favorably, since a viscoelastic plastic foam that is preferably used as the damping material is particularly good at absorbing changes in shear stresses caused by vibrations.

In a development of this embodiment of the vibration-damping mount according to the invention, the plate-like parts of the damping device are concentric hollow profiled sections, especially hollow cylinders. The hollow profiled sections do not necessarily need to have shapes similar to one another.

In one embodiment of the vibration-damping mount according to the invention, the damping device consists of a plurality of separate individual elements. These individual elements are fastened between the unit being held and the supporting structure.

In a preferred embodiment of the vibration-damping mount according to the invention, the supporting structure is designed so that the center of gravity of the unit being held is located approximately at the height of the shock absorption elements. This results in a stable arrangement, and the unit being held does not tend to tip over even when it is in an oblique position.

The shock absorption elements generally function pneumatically, with a gas (for example air, nitrogen, or carbon dioxide) as the damping medium. They have connectors for delivering and releasing the gas, and thus make it possible to raise the unit being held, for example so that an existing stand can be removed.

These and other objects, features, and advantages of the invention will be clarified by the following detailed description in conjunction with the drawings. The features evident from the drawings, the description, and the claims may be realized each individually, or severally in any combination among them, in an embodiment of the invention.

DETAILED DESCRIPTION OF THE PREFERRED EMBODIMENTS

Figure 1:
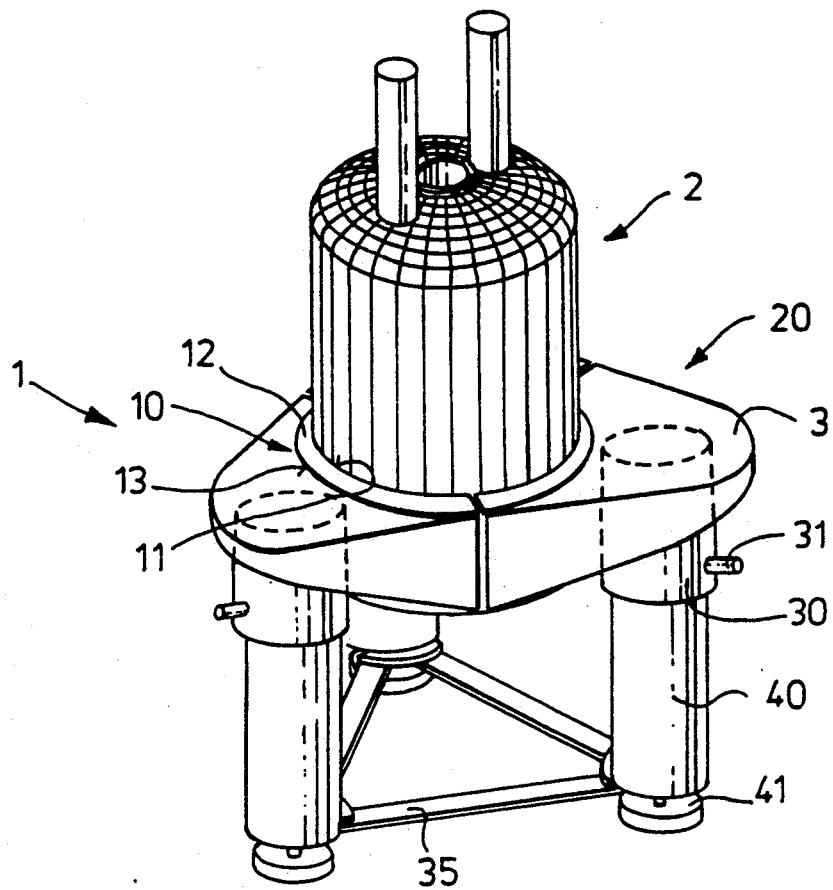
FIG. 1 shows a view of one embodiment of the vibration-damping mount according to the invention.

The embodiment of the vibration-damping mount 1 according to the invention depicted in FIG. 1 holds a cryostat 2 of a superconducting magnet system of an NMR spectrometer. This vibration-damping mount 1 has a damping device 10, a supporting structure 20, shock absorption elements 30, and height adapters 40.

Figure 2:
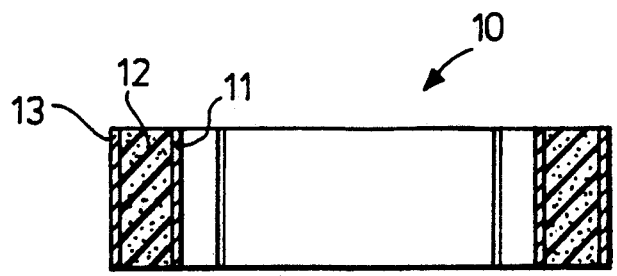
FIG. 2 shows a section through the damping device of the vibration-damping mount according to the invention.

The damping device 10 shown in FIG. 2 consists of an inner hollow cylinder 11 (inner cylinder) and an outer hollow cylinder 13 (outer cylinder) concentric therewith, both of which can be made of aluminum, steel, or composite material. Since the damping device 10 is located in the leakage field of the superconducting magnet system of the NMR spectrometer, antimagnetic CrNi steel must be used if the hollow cylinder 13 is made of steel. A viscoelastic plastic foam acting as the damping material 12 is located between these two cylinders. The inner cylinder 11 of the damping device surrounds the cryostat 2.

The center axis of the cylindrical damping device 10 runs vertically. As a result, the weight of the cryostat 2 is transferred through the damping material 12, by means of shear forces, to the supporting structure 20. The shear forces produce shear stresses in the damping material 12. Since the damping material 12 is particularly good at absorbing changes in shear stresses caused by vibrations, the damping effect of the damping material is optimally utilized.

The damping material 12 is adhesively bonded to the inner and outer cylinders 11, 13. The two concentric cylinders 11, 13 do not touch one another.

The supporting structure 20 of the embodiment of the vibration-damping mount 1 according to the invention that is depicted is a welded construction made from plate-like parts of aluminum or antimagnetic CrNi steel. At its center is a cylindrical opening to receiving the damping device 10. The outer cylinder 13 of the damping device 10 is adhesively bonded to the supporting structure 20. The damping device 10 and the supporting structure 20 are divided, radially with respect to the cylinder axis, into three segments 3. These segments 3 each comprise, in addition to the damping device 10 and the supporting structure 20, one shock absorption element 30 and one height adapter. The segments 3 are bolted to one another.

The damping medium of the shock absorption elements is compressed air, nitrogen, or carbon dioxide. These shock absorption elements 30 provide vibration damping in addition to the damping device 10.

Attached at the lower end of the shook absorption elements 30 are height adapters 40. These height adapters 40 have threaded feet 41, with which any non-uniformities in the installation surface can be compensated for, and the desired height above the floor can be precisely adjusted.

Connector struts 35 connect the shock absorption elements 30 or height adapters 40 to one another. The connector struts 35 define the spacing between the shock absorption elements 30 or the height adapters 40, and guarantee that they are aligned parallel to one another even if the supporting structure 20 has not yet been installed. In addition, the connector struts 35 produce an inherently stable structure for the vibration-damping mount 1.

In order to erect and assemble the vibration-damping mount 1 just described, the height adapters 40 are arranged in a triangle around the cryostat being held. The height of the height adapters 40 is adjusted with the threaded feet 41. Then the height adapters 40 are connected to one another with the connector struts 35. The shock absorption elements 30 are placed on the height adapters 40 and connected to a compressed air supply (not depicted) and a height regulation system (also not depicted). The damping device 10 and the supporting structure 20 are placed on the shock absorption elements 30 and fastened to the cryostat 2. If necessary, the cryostat 2 can now be lifted by delivering compressed air through connectors 31 into the shock absorption elements 30. An existing stand can be removed, and the cryostat 2 can then be lowered back down. The control system (not depicted) ensures that raising and lowering occur uniformly, and that the cryostat 2 returns precisely to its original position after it is lowered.

Since conventional stands generally do not project beyond the diameter of a cryostat 2 that is being held, such a stand does not interfere with the erection and assembly of the vibration-damping mount 1 according to the invention. The cryostat 2 can be raised up, together with an existing stand, by the vibration-damping mount 1, the stand can be unbolted and removed, and the cryostat 2 can be lowered back down into its original position.

The weight of the cryostat 2 is, for example, between approximately 0.3 metric ton and 1.3 metric tons; its height is between approximately 1.2 meters and 2 meters (without vent connectors); and its diameter is approximately 1 meter to 1.5 meters. The damping material 12 of the damping device 10 of the exemplary embodiment being described is AIREX R 63.80 of the Airex Company. This is a viscoelastic closed-pore plastic foam made of linear crosslinked PVC.

A variety of embodiments are possible for the supporting structure 20, a few of which will be described below. These can be designed so that the center of gravity of the cryostat 2 is located approximately at the height of the shock absorption elements 30.

Figure 3:
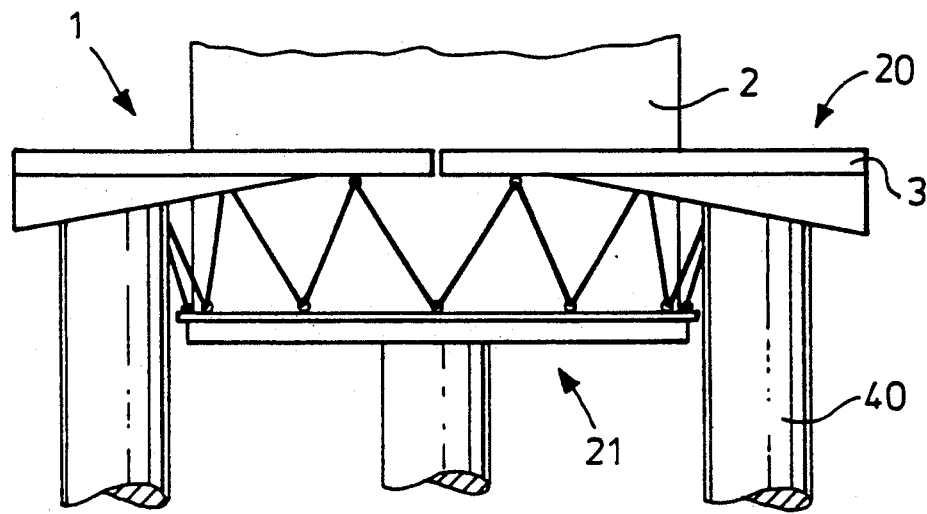
FIG. 3 shows a view of one embodiment of the vibration-damping mount according to the invention, the supporting structure of which has a wire cable design.
Figure 4:
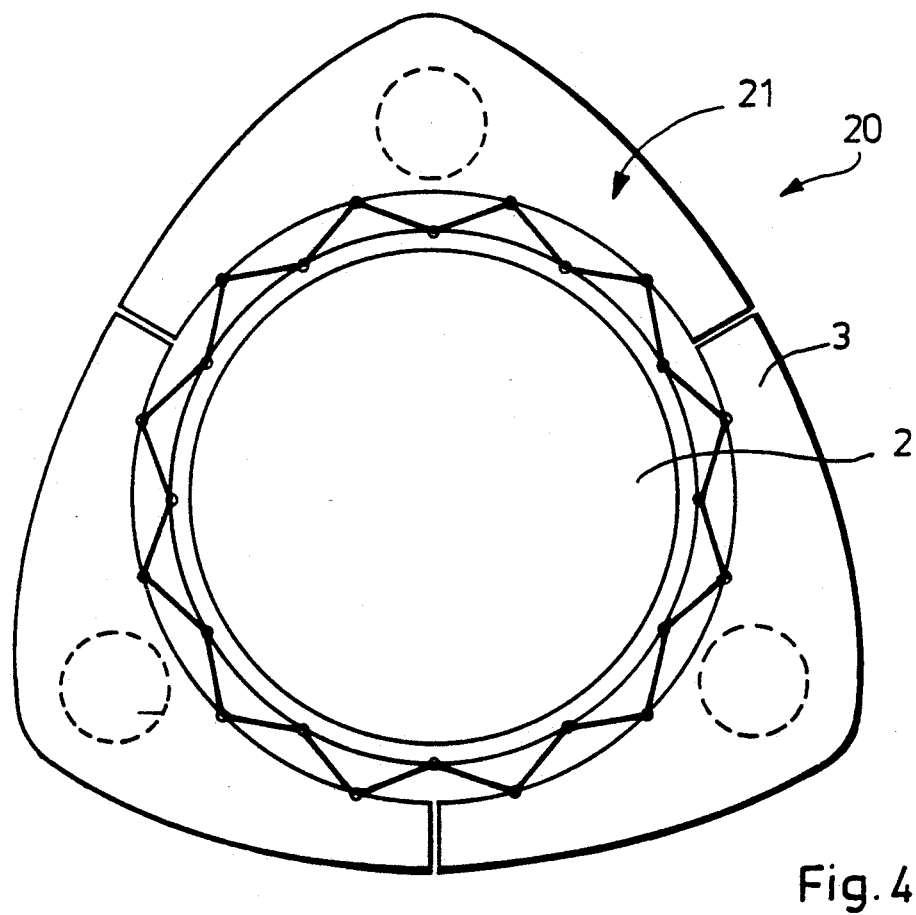
FIG. 4 shows a top view of the vibration-damping mount according to FIG. 3.

FIGS. 3 and 4 show a supporting structure 20 whose segments 3 form a frame. Fastened to this frame are wire cables from which is suspended a support plate on which the cryostat 2 sits. To prevent the cryostat from swinging, it is important to ensure with this design that the wire cables are arranged in triangular shapes, and have a sufficient slope in the radial direction. The main advantage of this embodiment is its low manufacturing costs. A further advantage is the additional vibration damping of the wire cables.

Figure 5:
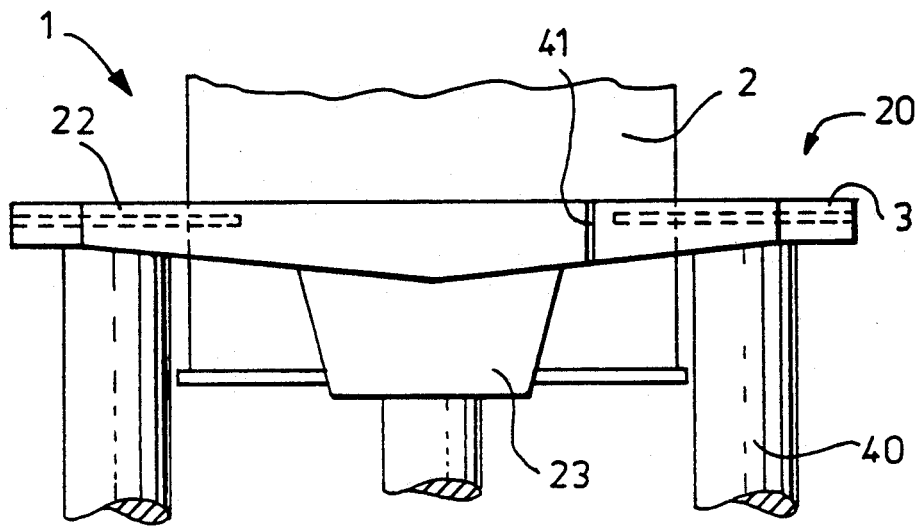
FIG. 5 shows a view of a further embodiment of the vibration-damping mount according to the invention.
Figure 6:
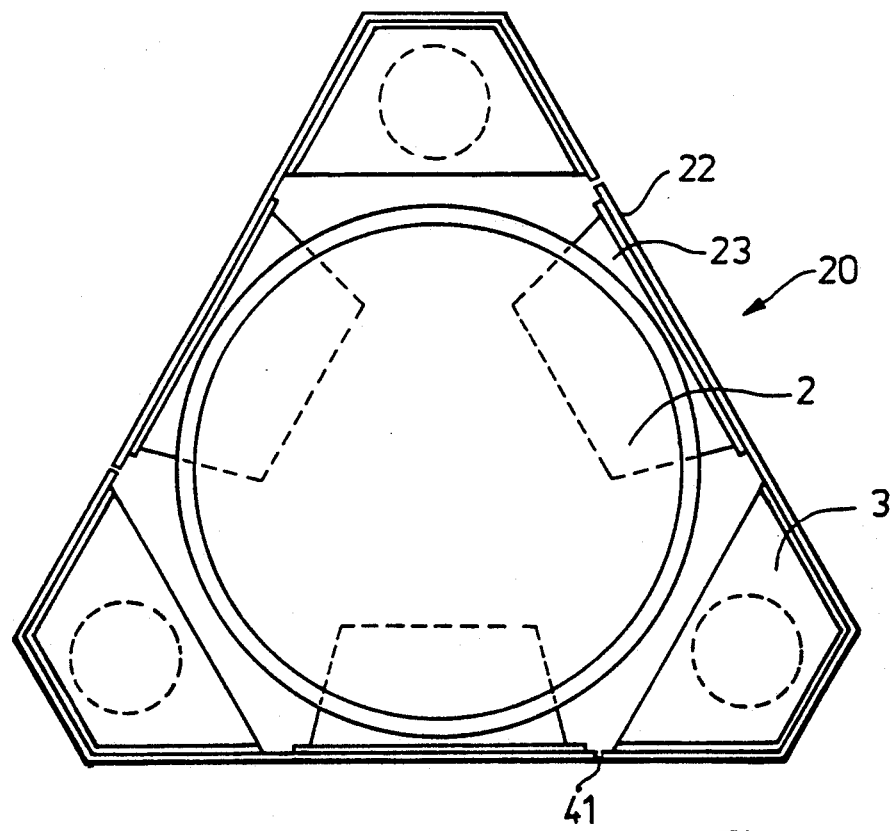
FIG. 6 shows a top view of the vibration-damping mount according to FIG. 5.

FIGS. 5 and 6 show a supporting structure 20 whose segments form a frame that is essentially triangular when seen from above, to which angle elements 23 are fastened. The angle elements 23 are each fastened in the center of the frame side. They project downward out of the plane of the frame, and are bent inward (towards the center) at the bottom. The cryostat 2 sits on these angle elements 23. The angle elements 23 do not touch one another. The segments 3 which form the frame can be separated laterally next to the angle elements 23, and one angle element 23 is fastened to each segment 3. A segment 3 has two arms of unequal length which contact a shock absorption element 30 or height adapter 40 at their upper ends, so that the joint 41 between two adjacent segments 3 is located eccentrically in the vicinity of the point at which the segment 3 is braced on the shock absorption element 30 or height adapter 40. The advantage of this embodiment of the invention is that the joints at which the vibration-damping mount 1 can be separated are short, and the vibration-damping mount 1 is therefore simple to manufacture and can be easily assembled.

Figure 7:
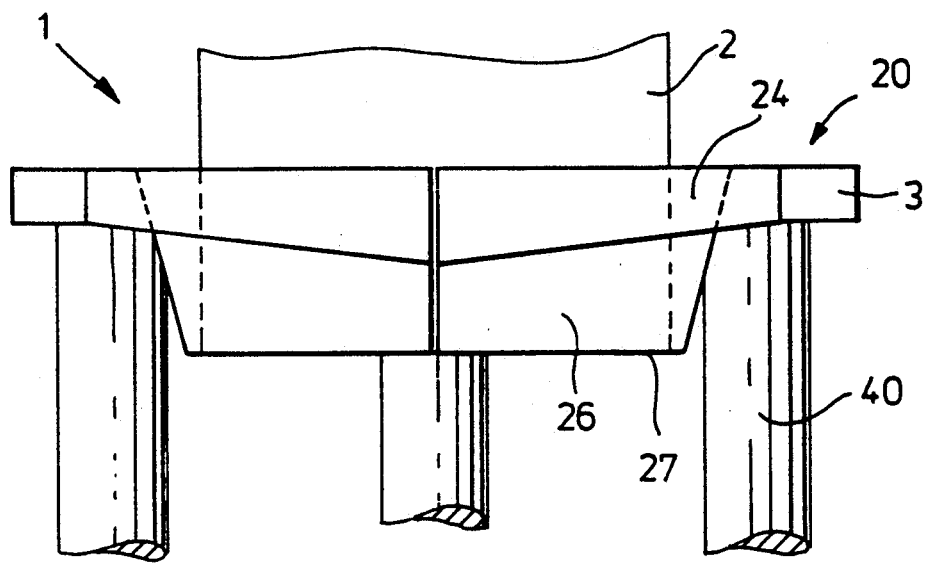
FIG. 7 shows a view of another embodiment of the vibration-damping mount according to the invention.
Figure 8:
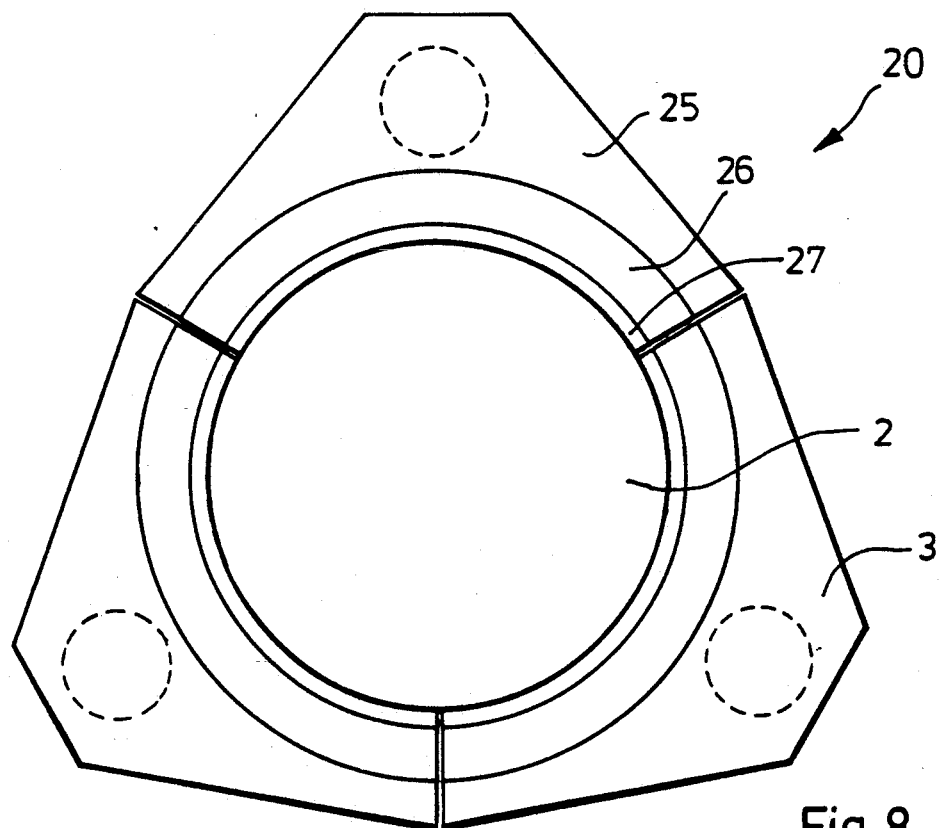
FIG. 8 shows a top view of the vibration-damping mount according to FIG. 7.

As FIGS. 7 and 8 show, the supporting structure 20 can take the form of a tub with a conical or cylindrical peripheral wall 26 and a floor 27. The cryostat 2 sits on the floor 27. The upper rim 25 of the supporting structure 20, projects, in at least some places, horizontally outward (away from the center) above the peripheral wall 26. The shock absorption elements 30 or height adapters 40 are fastened to this projecting rim. The individual joints of this embodiment of the invention each run between two shock absorption elements 30 or height adapters 40, through the rim 25, the peripheral wall 26 and the floor 27 to its center, where the three individual joints come together. The individual joints do not necessarily (as in the drawing) need to be arranged in the center between the shock absorption elements 30 or height adapters 40. Each segment 3 of this embodiment of the invention comprises a 120° section of the rim 25, the peripheral wall 26, and the floor 27, as well as one shock absorption element 30 and one height adapter 40. This embodiment of the supporting structure 20 can be manufactured as a welded structure made from suitably cut and bent aluminum sheets or sheets of CrNi steel.

Figure 9:
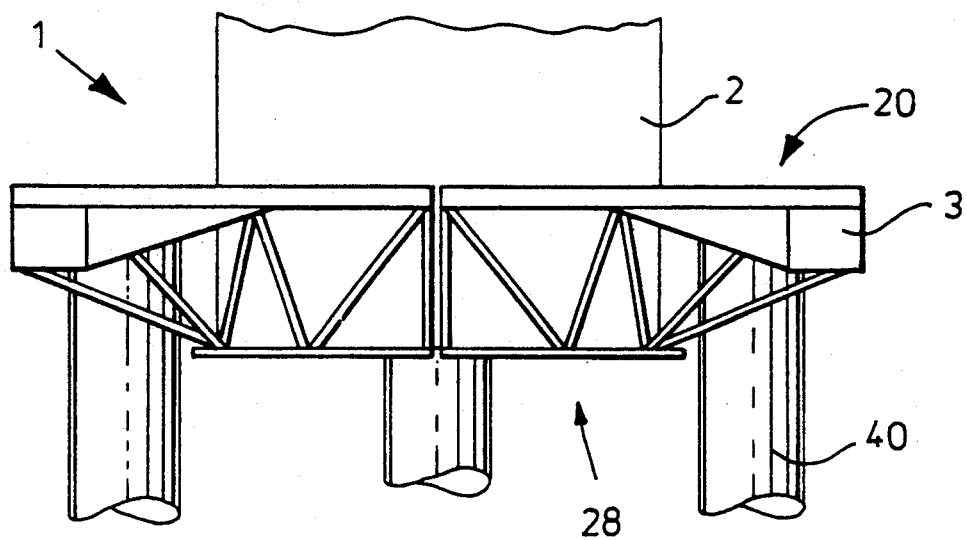
FIG. 9 shows a view of one embodiment of the vibration-damping mount according to the invention, the supporting structure of which has a three-dimensional lattice.
Figure 10:
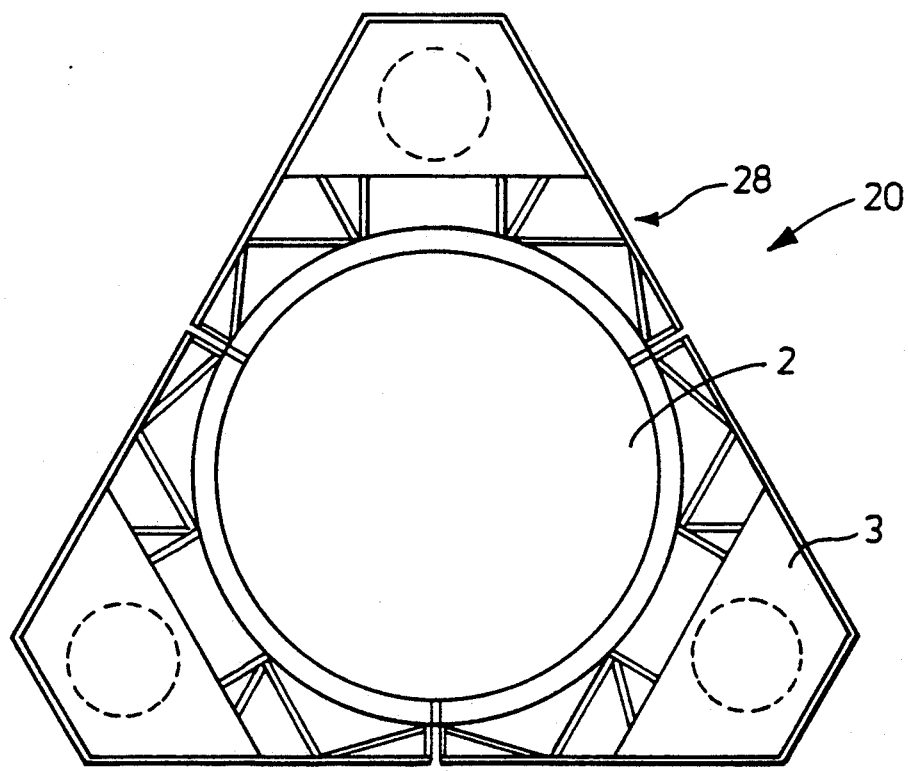
FIG. 10 shows a top view of the vibration-damping mount according to FIG. 9.

In a further embodiment of the supporting structure 20 according to FIGS. 9 and 10, the latter has a lattice 28. This lattice 28 consists of bars that are arranged three-dimensionally with respect to one another in such a way that loads on the lattice 28 in any direction produce stress along the long axes of the bars of the lattice 28. The bars are therefore loaded in tension or in compression, while bending stresses on these bars are eliminated. This embodiment of the supporting structure 20 is extremely rigid, so that vibrations in the supporting structure 20 itself can reliably be eliminated. The vibration-damping mount just described is capable of absorbing extremely small vibrations, such as building vibrations.

What is claimed is:

1. A vibration-damping mount for holding vibration-sensitive equipment, the vibration-damping mount comprising:
    a plurality of segments of essentially the same structure and adapted to attachment to one another to form the vibration-damping mount, each segment comprising:
    a damping device section;
    a supporting structure section;
    at least one shock absorption element; and
    a height adapter.

2. Vibration-damping mount according to claim 1, wherein the vibration-damping mount comprises three segments.

3. Vibration-damping mount according to claim 1, wherein the damping device of each segment has plate-like parts that are joined to one another by damping material means for transferring the weight of the vibration-sensitive equipment to the supporting structure.

4. Vibration-damping mount according to claim 3, wherein the plate-like parts are arranged essentially vertically.

5. Vibration-damping mount according to claim 3, wherein the plate-like parts are concentric hollow profiled sections.

6. Vibration-damping mount according to claim 5, wherein the hollow profiled sections form hollow cylinders.

7. Vibration-damping mount according to claim 1, wherein the supporting structure sections, when combined, comprise a three-dimensional lattice.

8. Vibration-damping mount according to claim 1, wherein the supporting structure sections are configured for supporting the vibration sensitive equipment at a position so that a center of gravity of the vibration sensitive equipment is located approximately at a height of the shock absorption elements.

9. Vibration-damping mount according to claim 1, wherein the the shock absorption elements comprise a gas damping medium.

10. Vibration-damping mount according to claim 9, wherein the shock absorption elements comprise connectors for delivering and releasing the gas damping medium.

11. Vibration-damping mount according to claim 1, wherein the supporting structure sections comprise wire cable means for suspending the vibration sensitive equipment in the vibration-damping mount (1).

12. Vibration-damping mount according to claim 1, wherein the segments form an essentially triangular frame having angle elements projecting downwardly and inwardly out of the plane of the frame.

13. Vibration-damping mount according to claim 1, wherein the supporting structure sections, when combined, comprise a floor, a conical or cylindrical peripheral wall extending upward from the floor, and an upper rim projecting, in at least some places, horizontally outward above the peripheral wall and to which the shock absorption elements are fastened.

14. Vibration-damping mount according to claim 1, wherein the supporting structure sections, when combined, comprise a floor, a conical or cylindrical peripheral wall extending upward from the floor, and an upper rim (25) projecting in at least some places, horizontally outward above the peripheral wall and to which the height adapters are fastened.

* * * * *